United States Patent
Djupsjöbacka et al.

(10) Patent No.: US 6,954,735 B1
(45) Date of Patent: Oct. 11, 2005

(54) METHOD AND SYSTEM OF SHOPPING WITH A MOBILE DEVICE TO PURCHASE GOODS AND/OR SERVICES

(75) Inventors: Kimmo Djupsjöbacka, Palo Alto, CA (US); Pekka Ollikainen, Los Gatos, CA (US); Jukka Hautanen, Tampere (FI); Esa Erola, Kauniainen (FI); Erkki Tanskanen, Vantaa (FI); Llari Saarikivi, Salo (FI); Ari Aarnio, Espoo (FI); Klaus Oesch, Helsinki (FI); Riitta Jokela, Tampere (FI); Tapio Hämeen-Anttila, Helsinki (FI)

(73) Assignee: Nokia Corporation, Espoo (FI)

( * ) Notice: Subject to any disclaimer, the term of this patent is extended or adjusted under 35 U.S.C. 154(b) by 608 days.

(21) Appl. No.: 09/410,978

(22) Filed: Oct. 1, 1999

(51) Int. Cl.[7] ............................................. G06F 17/60
(52) U.S. Cl. ........................................ 705/27; 701/201
(58) Field of Search ............................. 705/25, 26, 27; 701/200, 201

(56) References Cited

U.S. PATENT DOCUMENTS

| | | | |
|---|---|---|---|
| 5,250,789 A | 10/1993 | Johnsen ....................... 235/383 |
| 5,630,068 A | 5/1997 | Vela et al. ................... 395/201 |
| 5,848,373 A * | 12/1998 | DeLorme et al. ........... 701/200 |
| 5,901,287 A * | 5/1999 | Bull et al. .................... 395/200 |
| 5,948,040 A * | 9/1999 | DeLorme et al. ............ 701/201 |
| 6,023,241 A | 2/2000 | Clapper .................. 342/357.13 |
| 6,154,745 A * | 11/2000 | Kari et al. ................... 707/100 |

FOREIGN PATENT DOCUMENTS

| | | | | |
|---|---|---|---|---|
| WO | WO 9835469 A2 * | 8/1998 | | |
| WO | WO 99/30257 | 6/1999 | | |
| WO | 9930257 | 6/1999 | ........... | G06F/17/60 |

OTHER PUBLICATIONS

Comparison Shopping on the Web Built Around Symbol Hand–Held Computer, BarPoint.com Software. Press Release.Symbol News. Aug. 4, 1999. http://www.symbol. com/news/pressreleases/press_releases_portsys_barpo. html [retrieved on Apr. 30, 2002].*

Souped Up PDAs with GPS Capability Might Get Market Off the Ground. Feb. 18, 1998. Gale Group Newsletter. Wireless Data News, v6, n4.[retrieved on Apr. 29, 2002].*

GoAmerica and BarPoint.com to Offer Wireless Comparison Shopping. Jun. 17, 1999, Business Wire, p0302..[retrieved on Apr. 29, 2002].*

* cited by examiner

Primary Examiner—Joseph Thomas
Assistant Examiner—Natalie Pass
(74) Attorney, Agent, or Firm—Antonelli, Terry, Stout & Kraus, LLP

(57) ABSTRACT

The invention is a method of facilitating shopping with a mobile device (12) to obtain a plurality of purchased goods and/or services from a group of vendors (14) located at a shopping location (16). The method of the invention includes communicating from the mobile device with at least one server a selection of the goods and/or services to be purchased by a user of the mobile device on or before the user shops at the shopping location; the at least one server, in response to information stored therein regarding vendors located at the shopping location and the goods or services offered by the vendors and the selection of the plurality of purchased goods and/or services to be purchased by the user, causes an identification of the vendors from which available selected goods or services may be purchased and the available selected goods or services to be transmitted to the mobile device; and the mobile device provides to the user an identification of the available selected goods and/or services to be purchased and an itinerary of the user setting forth at least a choice of an order in which the user visits the identified vendors to obtain the goods and/or services to be purchased which is a function of at least one profile of the user.

43 Claims, 7 Drawing Sheets

FIG. 2

SHOPPING LOCATION

GOODS AND/OR SERVICE IDENTIFICATION
INCLUDING PRICE & VENDOR 14
IDENTIFICATION & LOCATION IN
SHOPPING LOCATION 16
1
2
.
.
.
n

FIG. 3

PERSONAL PROFILE(S)

(1) GOODS AND/OR SERVICES, SHOPPING CRITERIA e.g., PRICE, SHORTEST ROUTE, FASTEST ROUTE, BRAND PREFERENCE, SHOPPING LOCATION

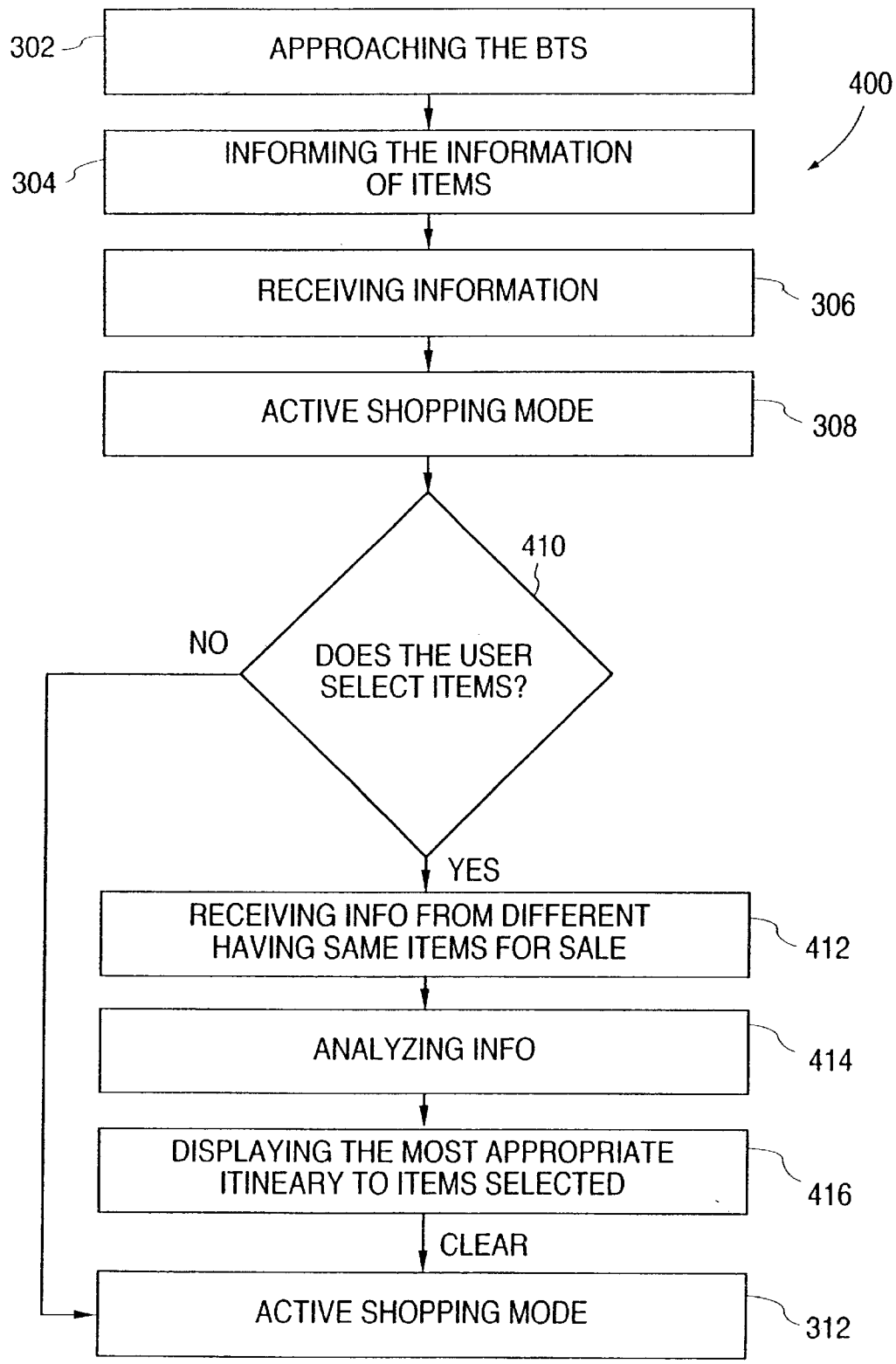

METHOD AND SYSTEM OF SHOPPING WITH A MOBILE DEVICE TO PURCHASE GOODS AND/OR SERVICES

BACKGROUND OF THE INVENTION

1. Field of the Invention

The present invention relates to methods and systems for shopping using mobile wireless devices.

2. Description of the Prior Art

European Patent Application EP 0 853 287 A2 discloses a method for transmission of information to the user of a search terminal to facilitate the obtaining of services along a route of travel. The method facilitates the obtaining of services along a travel route by accessing a database and using the user's personal profile to inform the user automatically of the services to be obtained, including their location point. The method uses a route of travel determined by the user to obtain the services and does not determine a route of travel for obtaining the services.

Systems have been proposed for facilitating shopping which utilize wireless communications between a vendor and a mobile device. See U.S. Pat. Nos. 5,250,789, 5,412,193, 5,572,653, 5,630,068, 5,715,314 and 5,729,697. Systems of this type provide a display of available products as a shopper moves the mobile device throughout a vendor's location. The display of the available products may change according to the shopper's location within the vendor's location so that the displayed products are related to the area in the vendor's location from which the products may be obtained. These systems do not provide shopping from shopping locations containing multiple vendors such as a shopping center.

SUMMARY OF THE INVENTION

The present invention is a method and system facilitating shopping with a mobile device to obtain a plurality of purchased goods and/or services from a group of vendors located at a shopping location. The mobile device may be, without limitation, a telephone terminal unit which has been modified or an electronic book telephone which has been modified to provide to the user an identification of available selected goods and/or services to be purchased from at least one shopping location. An itinerary of the user setting forth at least a choice of an order in which the user visits vendors to obtain the goods and/or services to be purchased, which is a function of at least one profile of the user, is preferably generated by at least one server, as described below, which is associated with the chosen shopping location. Alternatively, the itinerary may be generated by the mobile device.

In accordance with the invention, the user of the mobile device selects a particular shopping location at which the purchase of the goods or services is to occur from at least one shopping location from which the plurality of purchased goods and/or services could be obtained. The selection of a particular shopping location is conveyed by a wireless communication to at least one server associated with the selected shopping location. After selection of a particular shopping location from the plurality of possible shopping locations (assuming that the user wishes to consider more than one shopping location), the mobile device communicates a selection of goods and/or services to be purchased at the chosen shopping location to at least one server associated with the chosen shopping location via a communications network including wireless communications and preferably communications using at least in part a packet data network such as the internet. The wireless communications of the communication network may be without limitation mobile telephone communications, such as cellular communications, a general packet radio system (GPRS), and/or mobile telecommunications (UMTS) which permit linkage between the mobile device and the at least one server, while the mobile device is at a location physically remote from the shopping location or further may be by low power wireless communications, such as the proposed Bluetooth communication system, using high frequency RF communications. The at least one server functions in response to information stored therein related to vendors located at the chosen shopping location and the goods or services offered by the vendors and the selection of the plurality of purchased goods or services to be purchased by the user and causes an identification of the vendors from which available goods, selected goods or services may be purchased and the available selected goods or services to be transmitted to the mobile device.

The at least one user profile may specify that the itinerary represents the shortest distance of travel between the identified vendors, a fastest itinerary of travel between the identified vendors and/or a cheapest purchase price for at least some of the available selected goods or services.

The itinerary is provided by a display on the display of the mobile device. The itinerary may be in textual form, in map form with textual information overlaid on the map or a combination of a map and textual information with the itinerary being displayed relative to the map of the shopping location. The map may display the location of available products associated with a physical location of the available products within the vendors of the shopping location.

The mobile device may be used to place an order of purchase of at least some of the available selected goods and/or services through the at least one server either prior to the user's visiting the shopping location or while the user is physically present within the shopping location. When an order is placed through the server, the order is transmitted via a packet data network to one or more servers located at or associated with the shopping location. The at least one server may communicate with the individual vendors therein to elicit an acceptance from the vendors of the placement of the order for the selected goods and/or services. The order may include necessary electronic payment authorization such as that through a credit card or other mechanisms.

The at least one server may store information relating to the purchased goods and/or services such as, but not limited to, the purchase history of the user regarding all goods and services from the shopping location and/or the vendors therein. Such information can be made available to the user and/or third parties to enable financial analysis of the user's purchasing history.

The at least one server provides information regarding at least a physical location in the shopping location from which at least some of the available goods and/or services are to be purchased to the mobile device. The transmission of at least the physical location in the shopping center of at least some of the available goods and/or services to the user may be made in a number of forms such as, but not limited to, text and/or a map with a textual overlay of the selected available goods and/or services from the individual vendors depicted on the map. Additionally, the at least one server causes additional information to be transmitted such as, but not limited to, price of at least some of the available selected goods and/or services to the mobile device to enable the user to obtain information regarding the potential purchase.

As a security measure, an identification associated with the mobile device may be used by the at least one server to authenticate the user prior to transmission of the identified vendors and the available selected goods and/or services to the user.

A method of facilitating shopping with a mobile device to obtain a plurality of purchased goods and/or services from a group of vendors located at a shopping location in accordance with the invention includes communicating from the mobile device with at least one server a selection of the goods and/or services to be purchased by a user of the mobile device on or before the user shops at the shopping location; the at least one server, in response to information stored therein regarding vendors located at the shopping location and the goods and/or services offered by the vendors and the selection of the plurality of goods and/or services to be purchased by the user, causes at least an identification of the vendors from which available selected goods or services may be purchased and the available selected goods and/or services to be transmitted to the mobile device; and the mobile device provides to the user an identification of the available selected goods and/or services to be purchased and an itinerary of the user setting forth at least a choice of an order in which the user visits the identified vendors to obtain the goods and/or services to be purchased which is a function of at least one profile of the user.

The at least one profile may specify that the itinerary is a shortest distance of travel between the identified vendors, the itinerary is a fastest itinerary of travel between the identified vendors or that the itinerary provides a cheapest purchase price for at least some of the available selected goods or services.

The itinerary may be displayed relative to a map of the shopping location. The map may display the location of available products associated with a physical location of the available products within the shopping location. The mobile device may place an order of purchase of at least some of the available selected goods and/or services through the at least one server.

The at least one server may store information relating to the purchased goods and/or services. The stored information may be a history of the user purchasing goods and/or services from the shopping location and/or the vendors therein.

The at least one server, in response to the selection of the goods and/or services, may cause a transmission of at least a physical location in the shopping location of at least some of the available goods and/or services to the mobile device. The at least one server, in response to the selection of the goods and/or services, may cause additionally a transmission of a price of at least some of the available selected goods and/or services to the mobile device.

The mobile device may be a mobile telephone terminal or an electronic book.

The mobile device may have an identification; and the at least one server may use the identification to authenticate the user prior to transmission of the identified vendors and the available selected goods/or services.

The at least one profile of the user may be stored by the mobile device.

The at least one server may determine the itinerary and the itinerary may be transmitted to the mobile device or the mobile device may determine the itinerary.

A system facilitating shopping with a mobile device to obtain a plurality of purchased goods and/or services in accordance with the invention includes a shopping location having a group of vendors; at least one server which receives from the mobile device a selection of the goods and/or services to be purchased by a user of the mobile device on or before the user shops at the shopping location; and wherein the at least one server, in response to information stored therein regarding vendors located at the shopping location and the goods and/or services offered by the vendors and the selection of the plurality of goods and/or services to be purchased by the user, causes at least an identification of the vendors from which available selected goods or services may be purchased and the available selected goods and/or services to be transmitted to the mobile device; and the mobile device provides to the user an identification of the available selected goods and/or services to be purchased and an itinerary of the user setting forth at least a choice of an order in which the user visits the identified vendors to obtain the goods and/or services to be purchased which is a function of at least one profile of the user.

The itinerary may be displayed relative to a map of the shopping location. The map may display the location of available products associated with a physical location of the available products within the shopping location.

The mobile device may place an order of purchase of at least some of the available selected goods and/or services through the at least one server.

The at least one server may store information relating to the purchased goods and/or services. The stored information may be a history of the user purchasing goods and/or services from the shopping location and/or the vendors therein.

The at least one server, in response to the selection of the goods and/or services, may cause a transmission of at least a physical location in the shopping location of at least some of the available goods and/or services to the mobile device. The at least one server, in response to the selection of the goods and/or services, may cause additionally a transmission of a price of at least some of the available selected goods and/or services to the mobile device.

The mobile device may be a mobile telephone terminal or an electronic book.

The mobile device may have an identification; and the at least one server may use the identification to authenticate the user prior to transmission of the identified vendors and the available selected goods/or services.

The at least one profile of the user may be stored by the mobile device.

The at least one server may determine the itinerary and the itinerary is transmitted to the mobile device or the mobile device may determine the itinerary.

BRIEF DESCRIPTION OF THE DRAWINGS

FIG. 2 illustrates an example of information which may be stored by the at least one network server in the system of FIG. 1 pertaining to one or more shopping locations from which at least one product and/or service are purchased by the user.

FIG. 3 illustrates at least one personal profile of the user of the mobile device stored by the at least one server or mobile device used with the practice of the present invention.

FIG. 8 illustrates a flowchart of the operation of the present invention for generically determining an itinerary determined by the invention for purchasing goods and/or services within a shopping location.

Like numbers identify like parts throughout the drawings.

DESCRIPTION OF THE PREFERRED EMBODIMENTS

Figure 1:
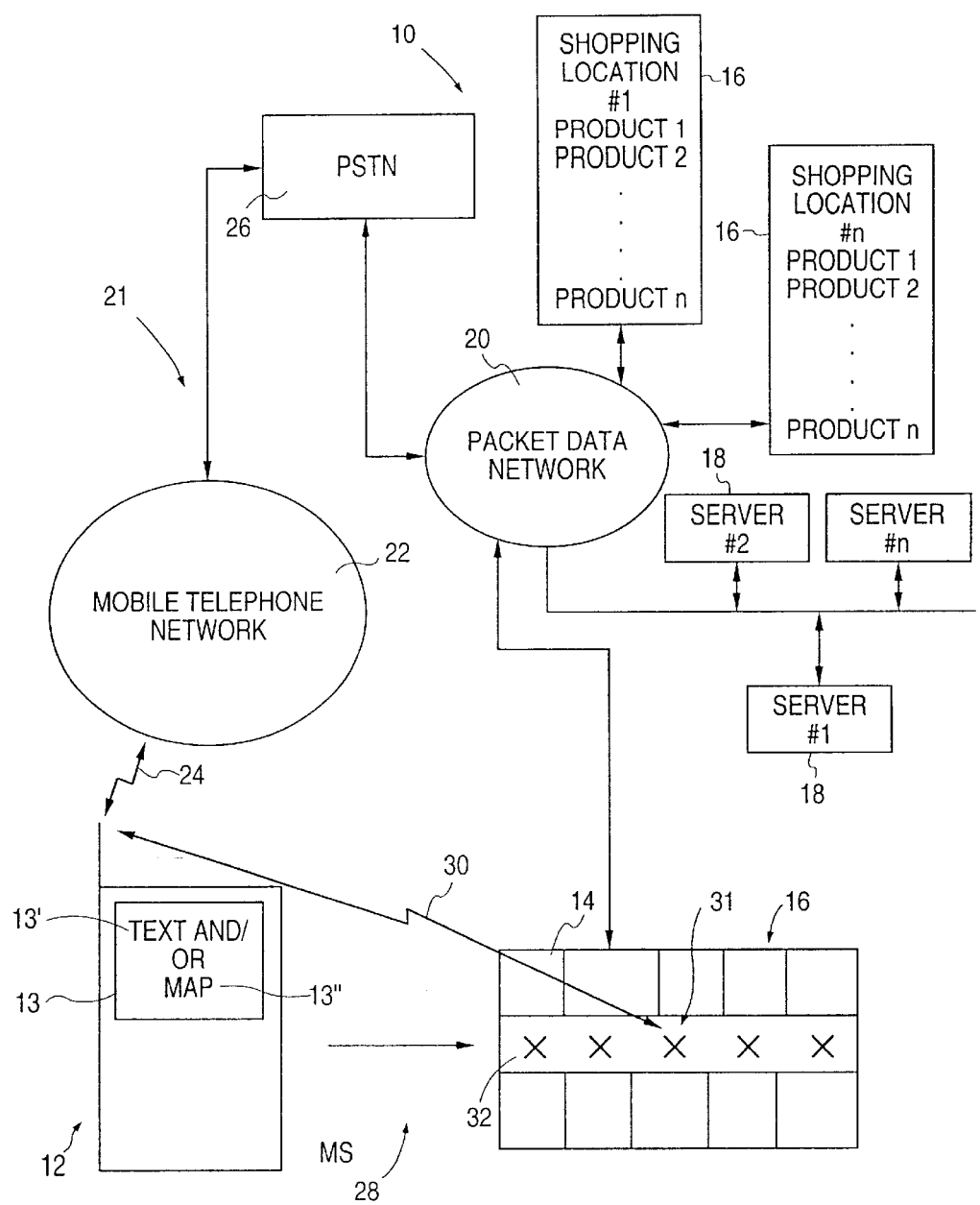
FIG. 1 illustrates a block diagram of a system in which the present invention may be practiced.

FIG. 1 illustrates a block diagram of a system 10 in which the method of the present invention of facilitating shopping with a mobile device 12 which may be a terminal to obtain a plurality of purchased goods and/or services from a group of vendors 14 located at a shopping location 16 is practiced. The mobile device 12 provides an output to a user by a display 13 of an identification of the available selected goods and/or services to be purchased from at least one of the vendors 14 and an itinerary 120 of the user within the shopping location 16 as illustrated in FIGS. 5B and 6 setting forth at least a choice of an order in which the user visits the identified vendors to obtain the goods and/or services to be purchased. The itinerary 120 illustrated in FIGS. 5B and 6 may without limitation be in text 13', by map 13", or by a combination of text and map.

Telecommunications are provided between the mobile device 12, at least one shopping location 16 and at least one server 18 which provides information about the shopping location, the available goods and/or services and preferably, the itinerary of the user, as described in more detail below. The at least one server 18 may be physically located at an associated shopping location 16, located proximate to the associated shopping location or located remote from the shopping location. Telecommunications provided by a packet data network 20, such as, but not limited to the internet, provide connectivity between each shopping location and the associated at least one server 18. The mobile device 12 communicates with at least one shopping location 16 to transmit the choice of shopping location of the user of the mobile device to the associated at least one server 18. The communications between the mobile device 12 and the at least one server may be by any mechanism including dial up links. The at least one server 18, in response to information stored therein regarding vendors 14 located at the at least one shopping location 16 and the goods and/or services offered by the vendors 14 and the selection of a plurality of purchased goods and/or services to be purchased by the user, causes an identification of the vendors from which available selected goods or services may be purchased and the available selected goods and/or services to be transmitted to the mobile device 12 and preferably, the itinerary 120 of the user to be followed which may be as simple as the order of purchase of the goods and/or services from the plurality of vendors 14 which may be indicated by text 13' on the display 13 to a more complex format, such as a map 13" of the shopping location 16 with the goods and/or services identified in association with the individual vendors and an itinerary 120 of the user through the shopping location 16 displayed on the map 13" based upon sensing of the current position of the mobile device within the shopping location. Once the current position of the mobile device 12 is sensed such as, without limitation, with a high frequency low power communication system deployed in the shopping location, such as Bluetooth communicating with the mobile device, the software of the at least one server 18 or optionally, the mobile device can list textually the order of visit of the itinerary 120 of the user or display a physical map 13" of the shopping location with the itinerary 120 overlaid based upon the sensed current position.

More than one server 18 may be used. Each server 18 may be allocated to storing information regarding an associated shopping location 16 which is provided via communications in a communications system 21, including by a packet data network therein, such as the internet 20 from the at least one server associated with the chosen shopping location 16 to the mobile device 12.

The communications system 21 utilized in the system 10 of FIG. 1 is comprised of multiple parts. A first part is a mobile telephone network 22 which provides wireless communications 24 between the mobile telephone network and the mobile device 12. The wireless communications may without limitation also utilize GPRS, UMTS or other wireless multimedia communications. The second part is the public switched telephone network 26 which is connected to the mobile telephone network 22. The third part is a packet data network 20 such as the internet. The fourth part is a low power RF communication system 28, which may be in accordance with the Bluetooth specification, providing alternative wireless communications 30 over short range to the mobile device 12, such as physically within the shopping location 16. An array 31 of low power transceivers, which are identified by an "X" in the shopping location 16, may be used to determine the physical location of the mobile device within the shopping location. The short broadcast range of the individual transmitters 32 in the transceiver array 31 permits the unique identification from each of the transmitters 32 to be individually received by the mobile device 12, which enables the mobile device to determine the approximate location of the mobile device within the shopping location. The detection of only a single unique identification of a transmitter 32 because of low broadcast power informs the mobile device 12 that the mobile device is within the limited distance of the broadcast range of a transmitter which provides sufficient position resolution for creation of an itinerary in map form. However, it should be understood that the present invention is not limited to the generation of a map in order to provide the mobile device with an itinerary with one embodiment of the invention providing the itinerary via textual information which identifies the vendors and the products and/or services by product or service number to be purchased by the user of the mobile device when visiting the shopping location 16.

In operation the user of the mobile device 12 may make a telephone call via the mobile telephone network 22 if the user is not proximate to the shopping location 16 or alternatively, may make a connection with the low power RF communication system 28, while in the shopping location, in order to link via the packet data network 20 to one or more of the servers 18 in order to initiate the shopping sequence. The individual servers 18 are updated with information from each associated shopping location 16 or shopping locations, as described in more detail in FIG. 2, which enables the mobile device 12 when present in the shopping location 16 to communicate with the one or more servers via mobile telephone network 22, the PSTN 26 and the packet data network 20, or low power RF communication system 28 and the packet data network 20, to initiate the shopping sequence by making a selection of a plurality of goods and/or services from the available goods and/or services to be obtained from the shopping location 16. After the initial communication is initiated by the mobile device 12 via either of the alternative communication routes, the at least one server 18, in response to information stored therein, as discussed below in conjunction with FIG. 2 regarding vendors 14 located at the shopping location 16 and the goods and/or services offered by the vendors and the selection of the plurality of the goods and/or services to be purchased by the user, causes an identification of the vendors from which available selected goods and/or services may be purchased and the available selected goods and/or services to be transmitted to the mobile device 12 and preferably, the itinerary of the user to be followed.

The information utilized by either the at least one server 18 or the mobile device 12 to generate the itinerary as discussed below includes one or more personal profiles as described below in conjunction with FIG. 3. Resident software generates, based upon the personal profile(s) of the user and the available goods and/or services from the shopping location 16, the itinerary of the user which sets forth at least a choice of an order in which the user visits the identified vendors to obtain the goods and/or services to be purchased which is a function of at least one profile of the user. The itinerary is without limitation textual, graphical or a combination thereof.

FIG. 2 illustrates information stored in the at least one of the server 18 regarding at least one shopping location 16. The information stored by the at least one server 18 includes a product/service identification which includes price and vendor identification and location in the shopping location. The physical location may be stored in textual form, graphical form or a combination thereof including the use of coordinates. As is illustrated, the aforementioned content of information is stored for each of the goods and/or services obtainable from the shopping location. The identification of each vendor 14 may be by name, number, position coordinates or other identifying information which may be processed to provide the display of the itinerary of shopping for the selected available goods and/or services to be purchased by the user of the mobile device 12 from the shopping location 16. The location information may be a map of the individual shopping location encoded with coordinates, such as illustrated in FIG. 1, wherein the location of a plurality of vendors 14 is illustrated relative to and within the shopping location 16. The itinerary may be defined textually or by a path on a map of travel which the user may take in the shopping location 16 based upon the current position of the mobile device 12 to purchase the available selected goods and/or services.

As has been described above, communications between the mobile device 12 and the low power RF communication system 28 via communications between individual transceivers 32 and the mobile device 12 permits the mobile device to determine a relative location of the mobile device within the shopping location 16. The relative physical location which is determined by this mechanism is not required to have a high degree of resolution since it is only necessary to determine the proximate location of the mobile device relative to individual vendors 14 in the shopping location 16 to map the starting point of the itinerary if it is desired to provide the itinerary in the form of a map with the position of the mobile device 12 overlaid on the map so as to enable the user of the mobile device 12 to determine their relative position on the map in the shopping location 16 as described in more detail below.

FIG. 3 illustrates a possible content of the at least one personal profile(s) stored by either the at least one server 18 or the mobile device 12. The personal profile(s) includes preferred goods and/or services, shopping criteria of the user which may be a combination of one or more of price preference, desirability to travel the shortest route to obtain selected goods and/or services, the fastest route to obtain the selected goods and/or services, brand preference or shopping location preference, etc. It should be understood that the personal profile(s) represents the "personality" of the user of the mobile device 12 for determining selection of available goods and/or services from the shopping location 16 and the itinerary. Once the identification of the available selected goods and/or services specified by the user during the initial communication with the at least on server 18 is delivered, the personal profile(s) is utilized by the software resident in the at least one server 18 or the mobile device 12 to select the desired criteria for the itinerary in the shopping location 16 of obtaining from the whole host of possible available goods and/or services and vendors thereof, those goods and/or services which are to be purchased from particular vendors. The implementation of a shortest route for shopping may be in accordance with any well known algorithm for determining the shortest distance for traveling between multiple points. The determination of an itinerary representing the fastest route will be dependent upon additional factors entered into the personal profile(s), such as the ability of any vendor 14 to provide fast service to the user of the mobile device 12 beyond determination of the shortest distance. Selection of an itinerary based upon price is simply dependent upon the identification of each of the available goods and/or services from multiple vendors 14 to determine the least expensive choice and does not involve any particular order of shopping. Similarly brand preference reflects the desire of the user of the mobile device 12 to obtain a product from a particular manufacturer. To the extent that multiple vendors 14 offer the same brand of product, additional criteria may be utilized, such as price, shortest route, fastest router, etc. Additionally, the shopping location 16 may be chosen subject to preferences, such as what time the shopping is to be performed and further, the initial relative location of the mobile device 12 relative to the shopping location which would, for example, may take into account travel time necessary to arrive at the shopping location 16 as part of the criteria for selecting the shopping location.

Figure 4:
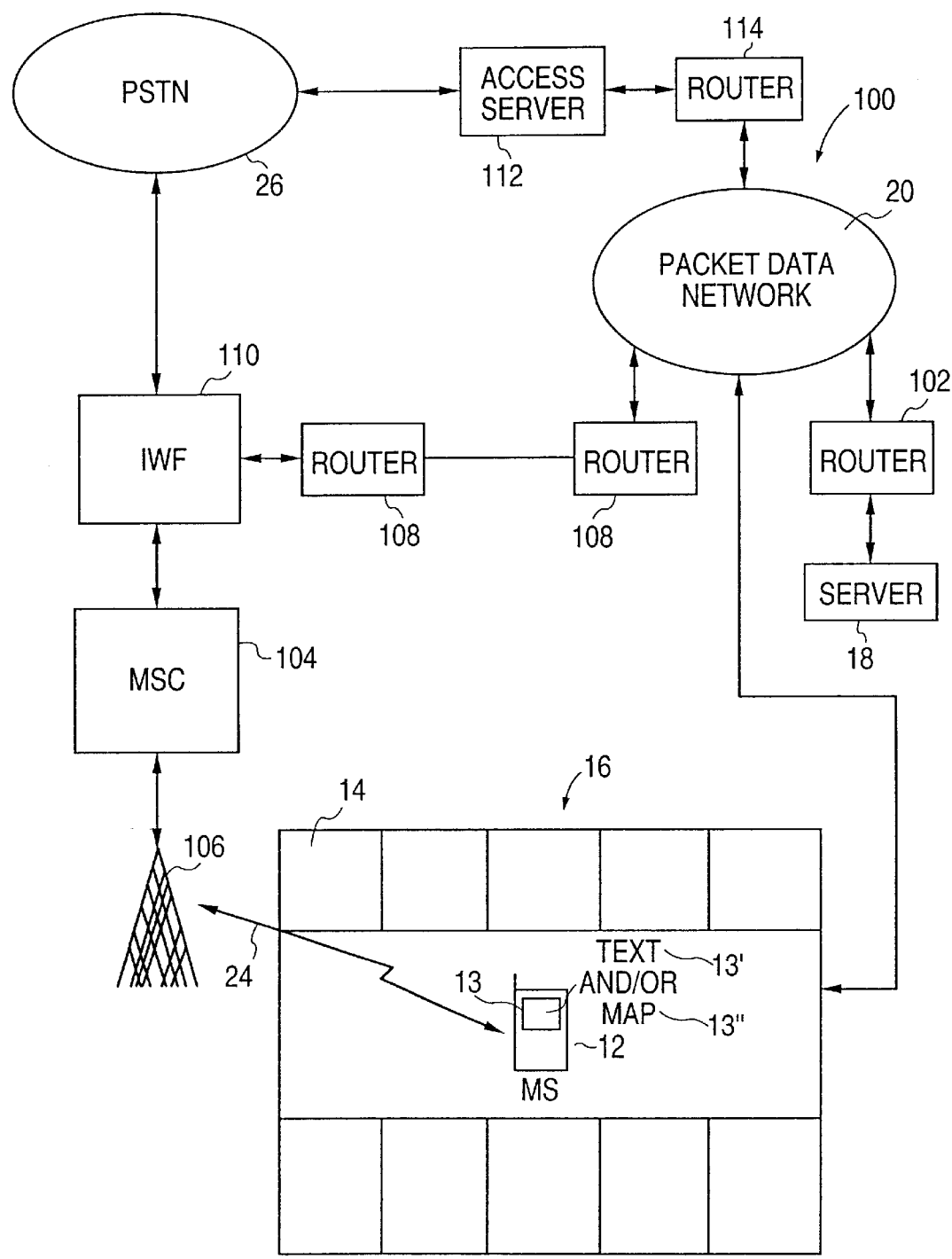
FIG. 4 illustrates a block diagram of another system in which the present invention may be practiced.

FIG. 4 illustrates another possible system 100 in which the present invention may be practiced using a cellular infrastructure such as the GSM telephone system. The itinerary may, without limitation, be on display in text 13', by map 13", or by a combination of text and map. The system 100 represents a more detailed implementation of a mobile telephone network implementation used to practice the present invention than that illustrated in FIG. 1. As illustrated, the individual at least one server 18 (only one is illustrated) is connected to the packet data network 20 by at least one router 102. A mobile switching center 104 is connected to a base station 106 which provides the wireless link 24 to the mobile device 12. The packet data network 20 is connected by a plurality of routers 108 through an interworking function 110. Alternatively, connections from the mobile device 12 via wireless link 24, base station 106, mobile switching center 104 and interworking function 110 may be through the PSTN 26, an access server 112 associated with the PSTN which is coupled to the packet data network 20 via router 114. An example of an interworking function is disclosed in the Assignee's Application WO 97/17790 which is incorporated herein by reference in its entirety. It should be understood that the aforementioned communication system is only exemplary as is the communication system of FIG. 1 in the practice of the present invention.

Figure 5A:
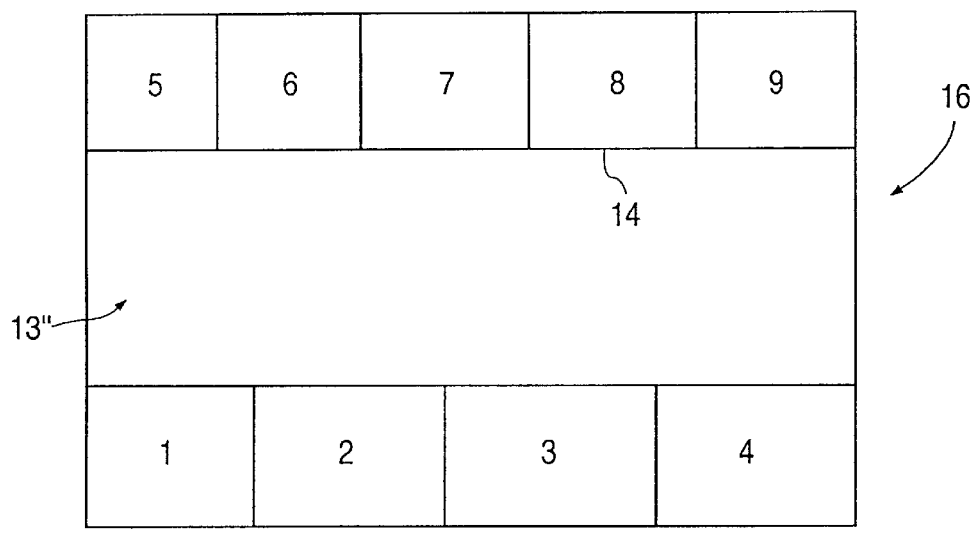
FIGS. 5A and 5B illustrate respectively a shopping location and an order of visiting of vendors within the shopping location in accordance with the method of the present invention.
Figure 5B:
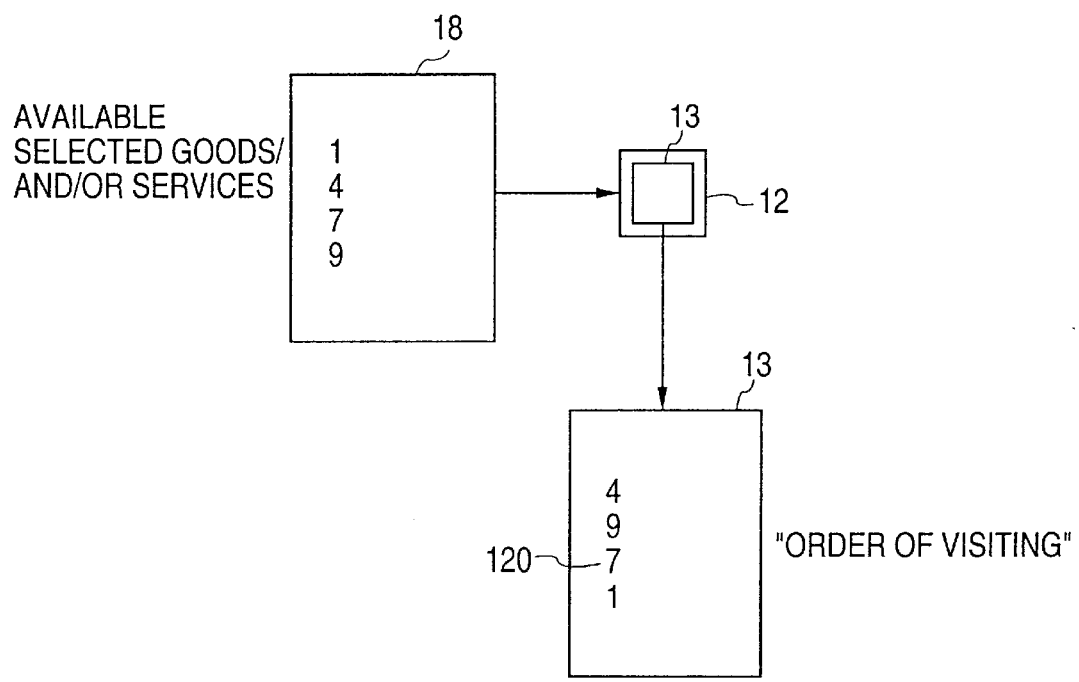
Figure 6:
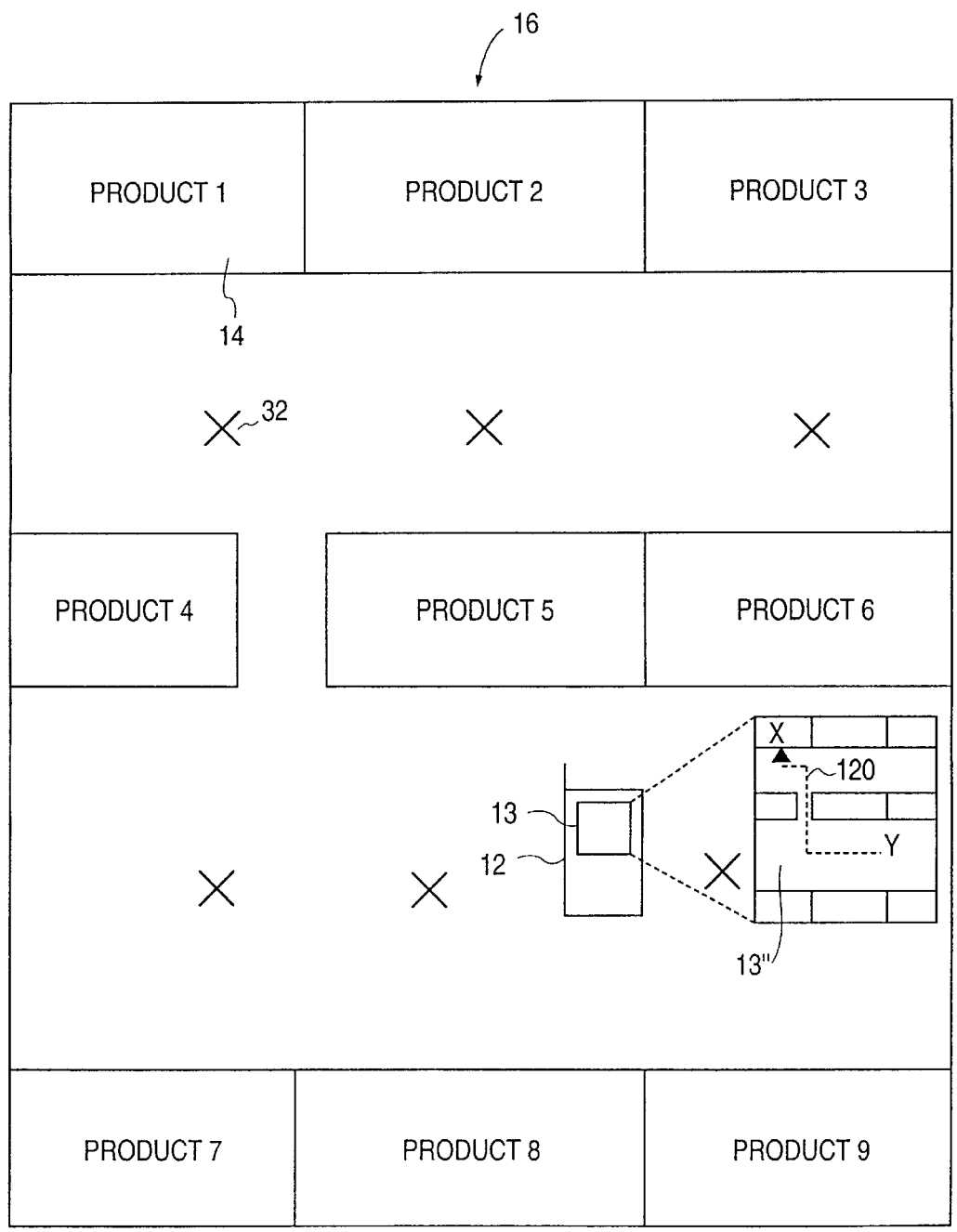
FIG. 6 illustrates an example of the practice of the invention within a shopping location of how the user of a mobile device proceeds to a vendor using an itinerary in accordance with the present invention.

FIG. 5A illustrates a map 13" of a shopping location 16 with individual vendors 14 being identified by numbers and FIG. 5B illustrates selected goods and/or services which are identified by the number of the vendors 14 which are "1", "4", "7" and "9". Each of the numbers should be understood to represent not only the location of the vendor 14 but also the actual goods and/or services which are to be purchased. Furthermore, additional information identifying the product(s) and/or service(s) to be purchased from each vendor 14 may be displayed along with the vendor identification number. As illustrated, the identification of the goods and/or services is communicated from server 18 to mobile device 12. As illustrated, the "order of visiting" or itinerary 120 represents, relative to the map of FIG. 5A, the shortest distance for obtaining the goods and/or services. The "order of visiting" or itinerary 120 is provided to the user by the display 13 of the mobile device 12 and may be determined by software resident in either the at least one server 18 or the mobile device 12. In determination of the shortest route for the order of visiting to obtain the selected goods and/or services "4", "9", "7" and "1", any known shortest distance of travel algorithm is applied once the available selected goods and/or services had been specified by the server 18. The geographic coordinates of each vendor 14 may be used in the determination of the shortest distance of travel.

FIG. 6 illustrates the method of the present invention in a shopping location 16 utilizing the display 13 to indicate an itinerary 120 displayed by the display relative to the current position "Y" of the mobile device 12 as displayed. The plurality of vendors 14 are illustrated as providing products 1–9. The itinerary 120 is graphically displayed as a dotted line to direct the mobile device 12 and user to vendor 14 which is selling product 1. While not illustrated, subsequent products to be purchased would sequentially also be illustrated on the display 13 with the itinerary to those products being displayed without limitation in a similar format. It should be understood, as described above, that the relative position of the mobile device 12 is determined by the short range transceivers 32 of FIG. 1 operating as low power transceivers or any other known position determining mechanism which enables the mobile device 12 to determine relatively its position within the shopping location 16 by receiving only one transmission at a time with a unique identification which places the mobile device 12 proximate to that identified transceiver.

Figure 7:
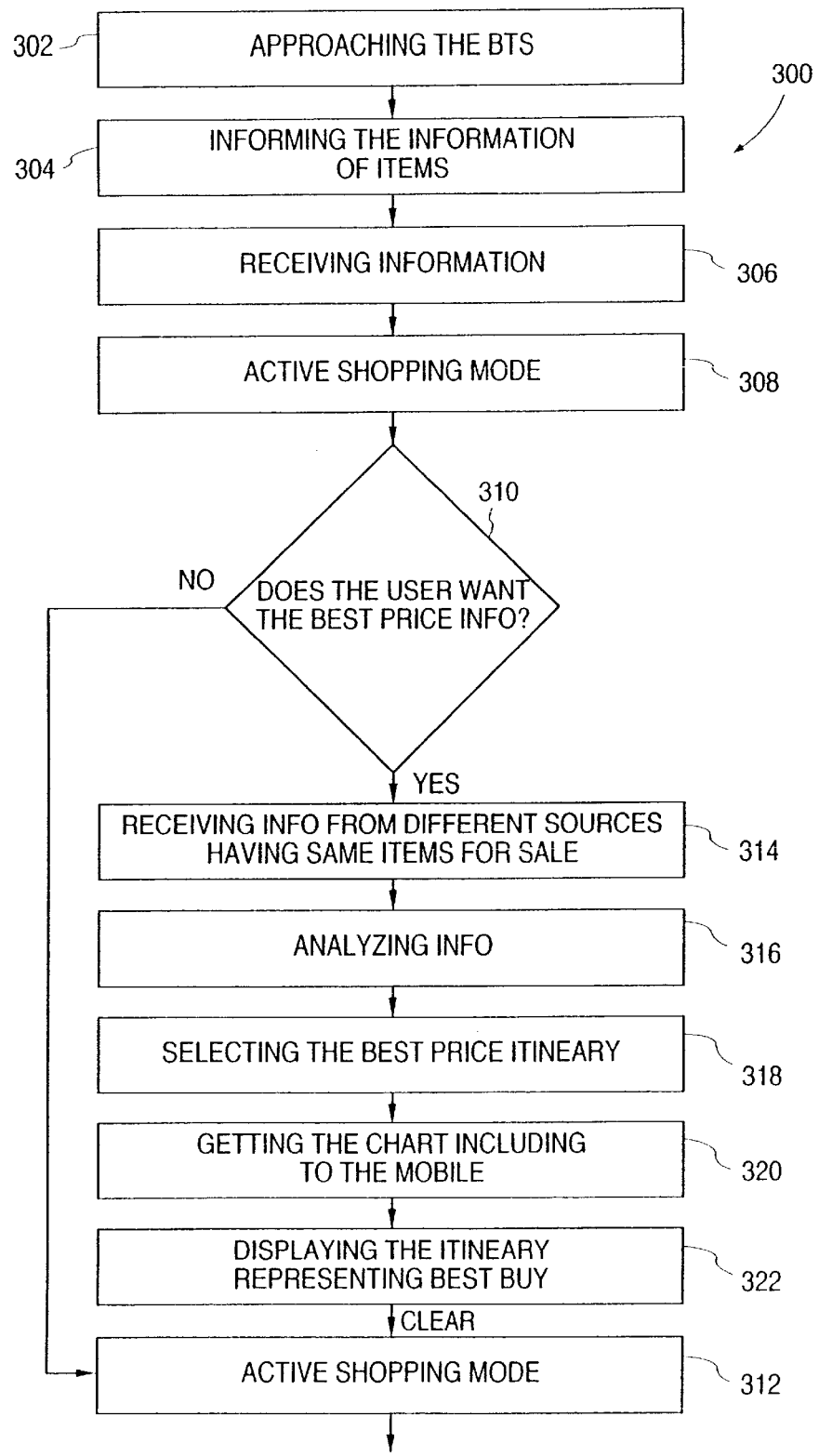
FIG. 7 illustrates a flowchart of the operation of the present invention in which the user obtains the best price in purchasing a plurality of goods and/or services over an itinerary determined by the invention.

FIG. 7 illustrates a flowchart 300 of the operation of the present invention in the system of FIG. 4. The method of shopping starts at point 302 where a wireless linkage 24 is established between the mobile device 12 and the base station 106. The method proceeds to point 304 where the user utilizes the mobile device 12 to communicate the plurality of goods and/or services to be purchased. The method proceeds to point 306 where the at least one server 18 receives the information specified by the user of the mobile terminal 12 which includes the identification of the goods and/or services to be purchased. The method proceeds to point 308 where the active shopping mode begins which represents when the user has information at the mobile device 12 for shopping purchases or otherwise. The method proceeds to decision point 310 where the user determines which criteria inputting to the mobile device 12 are to be applied for obtaining the itinerary. In the example illustrated in FIG. 7, decision point 310 represents a query to the user as displayed via the display 13, "Does the user want the best price information?" If the answer is "no", the method proceeds to point 312 where the active shopping mode is continued and where additional shopping criteria are applied, such as brand preference, etc., which are not illustrated. If the answer is "yes" at point 310, the method proceeds to point 314 where the mobile device 12 evaluates the received information from different vendors 14 offering the same goods and/or services for sale. Processing proceeds to point 316 where the received information from the multiple vendors 14 is analyzed to determine which of the plurality of vendors 14 will provide the selected identical goods and/or services at the best price. The method proceeds to point 318 where the selection of the best price route is made by the at least one server 18 based upon the identification of each of the individual vendors 14 providing each of the individual selected goods and/or services at the best price. The method proceeds to point 320 where the at least one server 18 transmits information, which preferably is in the form of a map, including the itinerary to the mobile device 12. The method proceeds to point 322 where the display of the itinerary representing the best buy is produced on the display 13 of the mobile device 12. The method proceeds to point 312 as described above where shopping may be performed.

FIG. 8 illustrates a flowchart of a generic shopping method for goods and/or services which may represent obtaining the best price of information and may represent the shortest distance, fastest route, a route for particular brand preference, etc. The initial steps of the method 400, namely 302, 304, 306 and 308 are identical to the process of FIG. 7 and are not described further herein. The method proceeds to decision point 410 where a determination is made whether the user selects goods and/or services which are to be purchased in accordance with an itinerary in accordance with any of the criteria set forth in FIG. 3. If the answer is "no" the process proceeds to point 312 as described above in conjunction with FIG. 7. If the answer is "yes" at point 410, the method proceeds to point 412 wherein information is received from different vendors 14 having the same goods and/or services for sale. The process proceeds to point 414 where the information is analyzed. The method proceeds to point 416 where the display 13 of the mobile device 12 displays the most appropriate itinerary to the goods and/or services selected. Step 416 should be understood as being generic of any of the criteria with reference to FIG. 3.

As illustrated, the mobile device 12 is involved with communications between the mobile device, the at least one server 18 and the at least one shopping location 16 if position information of the mobile unit therein is required and determines or receives from the at least one server 18 the itinerary to be followed by the user to obtain the selected available goods and/or services.

The mobile device 12 may be a telephone terminal device which further contains input/output devices permitting the entry of alphanumeric information permitting the selection of goods and/or services to be purchased and further, at least a display 13 permitting display of the itinerary and further in one embodiment, the determination of the itinerary based upon the execution of software resident in the mobile device.

The mobile device 12 further may be in the form of an electronic book which may be in accordance with any well known electronic book including, but not limited to, those described in U.S. Pat. Nos. 5,417,575, 5,847,698 and 5,893,132 which contains wireless communication functionality. Additionally, as illustrated in FIGS. 1 and 4, the mobile device 12 preferably further has multimode transceiver capability permitting cellular and low power RF or other communications to be utilized for the different communication links including communication with the individual shopping locations 16 and at least one server 18 associated therewith while proximate to the individual vendors 14 contained in the individual shopping locations.

While the invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A method of facilitating shopping with a mobile device to obtain a plurality of at least one of purchased goods or services from a group of vendors located at a shopping location comprising:

communicating from the mobile device with at least one server a selection of at least one of the goods or the services to be purchased by a user of the mobile device on or before the user shops at the shopping location;

the at least one server, in response to information stored therein regarding vendors located at the shopping location and the at least one of the goods or the services offered by the vendors and the selection of the plurality of the at least one of the goods or the services to be purchased by the user, causes at least an identification of the vendors from which available selected goods or services may be purchased and the available selected at least one of the goods or the services to be transmitted to the mobile device; and the mobile device provides to the user an identification of the available selected at least one of the goods or the services to be purchased and an itinerary of the user setting forth at least a choice of an order in which the user physically visits the identified vendors at the shopping location to obtain the at least one of the goods or the services to be purchased which itinerary is a function of at least one profile of the user.

2. A method in accordance with claim 1 wherein:

the at least one profile specifies that the itinerary is a shortest distance of travel between the identified vendors.

3. A method in accordance with claim 2 wherein:

the itinerary is displayed relative to a map of the shopping location.

4. A method in accordance with claim 3 wherein:

the map displays the location of the available products associated with a physical location of the available products within the shopping location.

5. A method in accordance with claim 2 wherein:

the at least one server, in response to the selection of the at least one of the goods or the services, causes a transmission of at least a physical location in the shopping location of at least some of the available at least one of the goods or the services to the mobile device.

6. A method in accordance with claim 5 wherein:

the at least one server, in response to the selection of the at least one of the goods or the services, causes additionally a transmission of a price of at least some of the available selected goods and/or services to the mobile device.

7. A method in accordance with claim 1 wherein:

the at least one profile specifies that the itinerary is a fastest itinerary of travel between the identified vendors.

8. A method in accordance with claim 7 wherein:

the itinerary is displayed relative to a map of the shopping location.

9. A method in accordance with claim 8 wherein:

the map displays the location of the available products associated with a physical location of the available products within the shopping location.

10. A method in accordance with claim 7 wherein:

the at least one server, in response to the selection of the at least one of the goods or the services, causes a transmission of at least a physical location in the shopping location of at least some of the available at least one of the goods or the services to the mobile device.

11. A method in accordance with claim 10 wherein:

the at least one server, in response to the selection of the at least one of the goods or the services, causes additionally a transmission of a price of at least some of the available selected goods and/or services to the mobile device.

12. A method in accordance with claim 1 wherein:

the at least one profile specifies that the itinerary provides a cheapest purchase price for at least some of the available selected goods or services.

13. A method in accordance with claim 12 wherein:

the itinerary is displayed relative to a map of the shopping location.

14. A method in accordance with claim 13 wherein:

the map displays the location of the available products associated with a physical location of the available products within the shopping location.

15. A method in accordance with claim 12 wherein:

the at least one server, in response to the selection of the at least one of the goods or the services, causes a transmission of at least a physical location in the shopping location of at least some of the available at least one of the goods or the services to the mobile device.

16. A method in accordance with claim 15 wherein:

the at least one server, in response to the selection of the at least one of the goods or the services, causes additionally a transmission of a price of at least some of the available selected goods and/or services to the mobile device.

17. A method in accordance with claim 1 wherein:

the itinerary is displayed relative to a map of the shopping location.

18. A method in accordance with claim 17 wherein:

the map displays the location of available products associated with a physical location of the available products within the shopping location.

19. A method in accordance with claim 1 wherein:

the mobile device places an order of purchase of at least some of the available selected at least one of the goods or the services through the at least one server.

20. A method in accordance with claim 19 wherein:

the at least one server stores information relating to the purchased at least one of the goods or the services.

21. A method in accordance with claim 20 wherein:

the stored information is a history of the user purchasing goods and/or services from the shopping location and/or the vendors therein.

22. A method in accordance with claim 1 wherein:

the at least one server, in response to the selection of the at least one of the goods or the services, causes a transmission of at least a physical location in the shopping location of at least some of the available at least one of the goods or the services to the mobile device.

23. A method in accordance with claim 22 wherein:

the at least one server, in response to the selection of the at least one of the goods or services, causes additionally a transmission of a price of at least some of the available selected goods and/or services to the mobile device.

24. A method in accordance with claim 1 wherein:

the mobile device is a mobile telephone terminal.

25. A method in accordance with claim 1 wherein:

the mobile device is an electronic book.

26. A method in accordance with claim 1 wherein:

the mobile device has an identification; and the at least one server uses the identification to authenticate the user prior to transmission of the identified vendors and the available selected at least one of the goods the services.

27. A method in accordance with claim 1 wherein:

the at least one profile of the user is stored by the mobile device.

28. A method in accordance with claim 1 wherein:

the at least one server determines the itinerary and the itinerary is transmitted to the mobile device.

29. A method in accordance with claim 1 wherein:

the mobile device determines the itinerary.

30. A system facilitating shopping with a mobile device to obtain a plurality of at least one purchased goods or the services comprising:

a shopping location having a group of vendors;

at least one server which receives from the mobile device a selection of the at least one goods or the services to be purchased by a user of the mobile device on or before the user shops at the shopping location; and wherein the at least one server, in response to information stored therein regarding vendors located at the shopping location and the at least one of goods or the services offered by the vendors and the selection of the plurality of the at least one of goods or the services to be purchased by the user, causes at least an identification of the vendors from which available selected goods or services may be purchased and the available selected at least one of goods or the services to be transmitted to the mobile device; and the mobile device provides to the user an identification of the available selected at least one of goods or the services to be purchased and an itinerary of the user setting forth at least a choice of an order in which the user physically visits the identified vendors at the shopping location to obtain the at least one of goods or the services to be purchased which is a function of at least one profile of the user.

31. A system in accordance with claim 30 wherein:

the itinerary is displayed relative to a map of the shopping location.

32. A system in accordance with claim 31 wherein:

the map displays the location of available products associated with a physical location of the available products within the shopping location.

33. A system in accordance with claim 30 wherein:

the mobile device places an order of purchase of at least some of the available selected at least one of goods or the services through the at least one server.

34. A system in accordance with claim 33 wherein:

the at least one server stores information relating to the purchased at least one of goods or the services.

35. A system in accordance with claim 34 wherein:

the stored information is a history of the user purchasing at least one of goods or the services from at least one of the vendors therein.

36. A system in accordance with claim 30 wherein:

the at least one server, in response to the selection of the at least one of goods or the services, causes a transmission of at least a physical location in the shopping location of at least some of the available at least one of goods or the services to the mobile device.

37. A system in accordance with claim 36 wherein:

the at least one server, in response to the selection of the at least one of goods or the services, causes additionally a transmission of a price of at least some of the available selected at least one of goods or the services to the mobile device.

38. A system in accordance with claim 30 wherein:

the mobile device is a mobile telephone terminal.

39. A system in accordance with claim 30 wherein:

the mobile device is an electronic book.

40. A system in accordance with claim 30 wherein:

the mobile device has an identification; and the at least one server uses the identification to authenticate the user prior to transmission of the identified vendors and the available selected at least one of goods or the services.

41. A system in accordance with claim 30 wherein:

the at least one profile of the user is stored by the mobile device.

42. A system in accordance with claim 30 wherein:

the at least one server determines the itinerary and the itinerary is transmitted to the mobile device.

43. A system in accordance with claim 30 wherein:

the mobile device determines the itinerary.

* * * * *

UNITED STATES PATENT AND TRADEMARK OFFICE
CERTIFICATE OF CORRECTION

PATENT NO. : 6,954,735 B1  
APPLICATION NO. : 09/410978  
DATED : October 11, 2005  
INVENTOR(S) : Kimmo Djupsjöbacka et al.

Page 1 of 1

It is certified that error appears in the above-identified patent and that said Letters Patent is hereby corrected as shown below:

On the cover page, References Cited section (56), U.S. Patent Documents:
   Please insert the following references:

| | | |
|---|---|---|
| --5,893,132 | 04/1999 | Huffman et al |
| 5,859,414 | 01/1999 | Grimes et al |
| 5,847,698 | 12/1998 | Reavey et al |
| 5,729,697 | 03/1998 | Schkolnick et al |
| 5,715,314 | 02/1998 | Payne et al |
| 5,412,193 | 05/1995 | Swartz et al |
| 5,417,575 | 05/1995 | McTaggart |
| 5,572,653 | 11/1996 | DeTemple et al-- |

On the cover page, Abstract section (57), Line 1:
   Please replace "is a method of facilitating" with --facilitates--

On the cover page, Abstract section (57), Lines 16-22:
   Please replace "mobile decive; and the mobile device provides to the user an identification of the available selected goods and/or services to be purchased and an itinerary of the user setting forth at identified vendors to obtain the goods and/or services to be purchased which is a function of at least one profile of the user." with --mobile device.--

In Column 14, Claim 30, Line 5:
   Please replace "which is" with --which itinerary is--

Signed and Sealed this

Twenty-fifth Day of July, 2006

JON W. DUDAS  
*Director of the United States Patent and Trademark Office*